United States Patent
Ta

(10) Patent No.: US 7,187,988 B2
(45) Date of Patent: Mar. 6, 2007

(54) WEB SERVICE AND METHOD FOR CUSTOMERS TO DEFINE THEIR OWN ALERT FOR REAL-TIME PRODUCTION STATUS

(75) Inventor: Hsu Ming Ta, Hsinchi (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 366 days.

(21) Appl. No.: 10/661,792

(22) Filed: Sep. 12, 2003

(65) Prior Publication Data
US 2005/0060056 A1  Mar. 17, 2005

(51) Int. Cl.
  *G05B 11/01*  (2006.01)
  *G05B 9/02*  (2006.01)
  *G06F 19/00*  (2006.01)

(52) U.S. Cl. .................. 700/27; 700/80; 700/143; 700/21

(58) Field of Classification Search ............... 700/21, 700/26, 27, 32, 80, 109, 115, 143, 174, 177, 700/204, 110, 108
See application file for complete search history.

(56) References Cited

U.S. PATENT DOCUMENTS

| | | | |
|---|---|---|---|
| 5,847,957 A * | 12/1998 | Cohen et al. | 709/219 |
| 6,259,956 B1 | 7/2001 | Myers et al. | 700/80 |
| 6,397,116 B1 | 5/2002 | Matsumoto | 700/96 |
| 6,408,220 B1 | 6/2002 | Nulman | 700/121 |
| 6,450,411 B1 * | 9/2002 | Rash et al. | 236/44 A |
| 6,542,856 B2 * | 4/2003 | Frantz et al. | 702/188 |
| 2002/0198964 A1 * | 12/2002 | Fukazawa et al. | 709/219 |

* cited by examiner

*Primary Examiner*—Thomas Pham
(74) *Attorney, Agent, or Firm*—Haynes and Boone, LLP

(57) ABSTRACT

An automated method and system that uses a Web service to make real-time production status available to customers from a manufacturing environment. Each time Work in Process (WIP) data is updated from manufacturing execution systems to a central database, a database trigger checks the alert conditions. These conditions are automatically compared to the WIP data to see if the user-defined conditions have been met. If so, a function is called which automatically sends an alert to the customer via the internet and either e-mail, pager, or mobile phone.

26 Claims, 3 Drawing Sheets

FIG. 1 – Prior Art

WEB SERVICE AND METHOD FOR CUSTOMERS TO DEFINE THEIR OWN ALERT FOR REAL-TIME PRODUCTION STATUS

BACKGROUND OF THE INVENTION

1. Field of Invention

This invention relates generally to monitoring production status in manufacturing Fabs and, more particularly, to allowing customers to remotely define their own alerts and conditions for production status using a Web page and receiving automatic alerts.

2. Description of Related Art

The manufacturing environment creates product directly from a customer design with customers often needing to do special operations when certain engineering or production lots are moved to particular stages. An example of this would be a pilot lot being tested that might require a more complicated procedure by the customer at a certain point.

In the manufacture of semiconductor chips and wafers, the effect of this customer intervention can add an enormous cost to the production. The development of communication systems in which the customer can stay in contact with the manufacturing Fab engineers while staying at their home site has cut down on the tremendous cost of having the customer's development engineers on site to continually monitor production status. There are, however, still problems.

Currently a customer can log onto a Web site to check the Work in Progress (WIP) status of a Manufacturing Execution System (MES), but this needs to be done frequently as the status can change very quickly. Much time and manpower is required to make this work effectively. Even if the customer were to ask manufacturing employees to notify them of production status, there would still be costly time and manpower involved and a possible delay in getting the information which could hold up production. Improvements to this method and system are still needed for maximum efficiency, and this invention offers that.

U.S. Pat. No. 6,408,220 (Nulman) discusses semiconductor processing techniques in manufacturing. In U.S. Pat. No. 6,397,116 (Matsumoto) a production control system and method is discussed. In U.S. Pat. No. 6,259,956 (Myers et al.) a method and apparatus for site management of unattended robots storage and dispensing sites.

SUMMARY OF THE INVENTION

This invention's overall objective is to provide a method and system of alerting customers of the real-time manufacturing production status using the common tools of the Internet's World Wide Web (Web). It is an objective to allow customers to define their own alerts and conditions for being notified when certain production statuses occur in their products. It is another objective to allow these alerts and conditions to be set by product, lot, stage, and production status and to be done so remotely by the customer over the Internet.

This method and system also has the objective to provide checks of the alert conditions pre-defined by the customer when Work in Process (WIP) data is updated. A final objective is to notify the customer automatically in real time when these alert conditions are met so that necessary customer interaction can take place.

BRIEF DESCRIPTION OF THE DRAWINGS

This invention will be described with reference to the accompanying drawings, wherein.

DETAILED DESCRIPTION OF THE PREFERRED EMBODIMENT

In complex semiconductor manufacturing environments, many specialized tools and procedures are involved in the creation of a wafer or chip. Many steps in a set sequence must be done correctly for a quality product that will meet the needs of the final using customer. Fabs must constantly examine the most efficient and cost-effective use of their tools to best put through multiple jobs simultaneously so that they can remain competitive. This means that routing and tool destination is constantly changing as reported by Work in Process (WIP) data updates. As the design of the semiconductor chip is frequently supplied by a customer that is external to the manufacturing company, this customer's involvement throughout all facets of the chip and wafer production is an integral part of the entire process.

Figure 1:
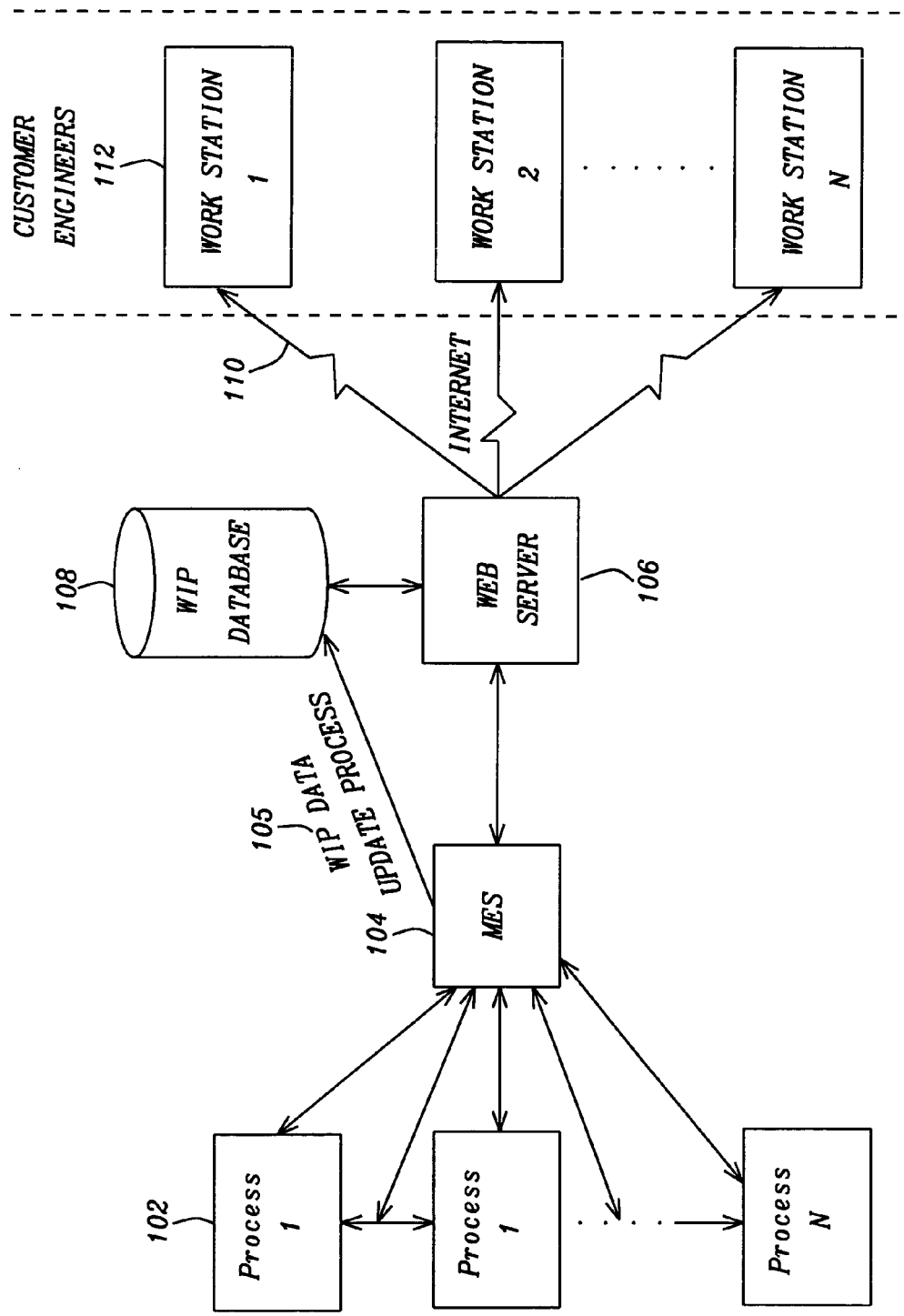
FIG. 1 is a block diagram that illustrates the prior art method.

In the prior art, involvement of the customer meant either having the customer's development engineers resident at the foundry, requesting Fab employees to keep a table of critical points in the manufacturing process and alerting the customer as requested, or having the customer make frequent checks manually on a Web site for production status updates. FIG. 1 illustrates the method. The manufacturing processes 1 to N 102 are building the customer's product. Each process is controlled and monitored by the Manufacturing Execution System (MES) 104 which might be one of several MES's as each Fab has its own MES. The MES provides real-time Update of the Work In Process (WIP) Data 105 to the WIP database 108. The Web Server 106 reads this WIP database and formats it into a Web screen that is provided in real time via the Internet 110 to the Customer Engineers 112 at their remote development sites. Here the customer engineers must frequently monitor production status watching for key points in the process when it might be necessary to do a special operation. Discretion is left to the customer engineers as to when to when to access the Web page to do this monitoring. Delays or problems can arise with a customer's product if a customer engineer is not made aware of a critical status in a timely fashion. Accessing the Web page to check the lot status from time to time is inefficient use of manpower and time and has the potential for delays and mistakes. The method and system of this invention eliminate these problems by allowing the customer engineer to define his/her own alerts and conditions for production status and to in real time automatically check status and alert the customer once the user-defined conditions are met.

Figure 2:
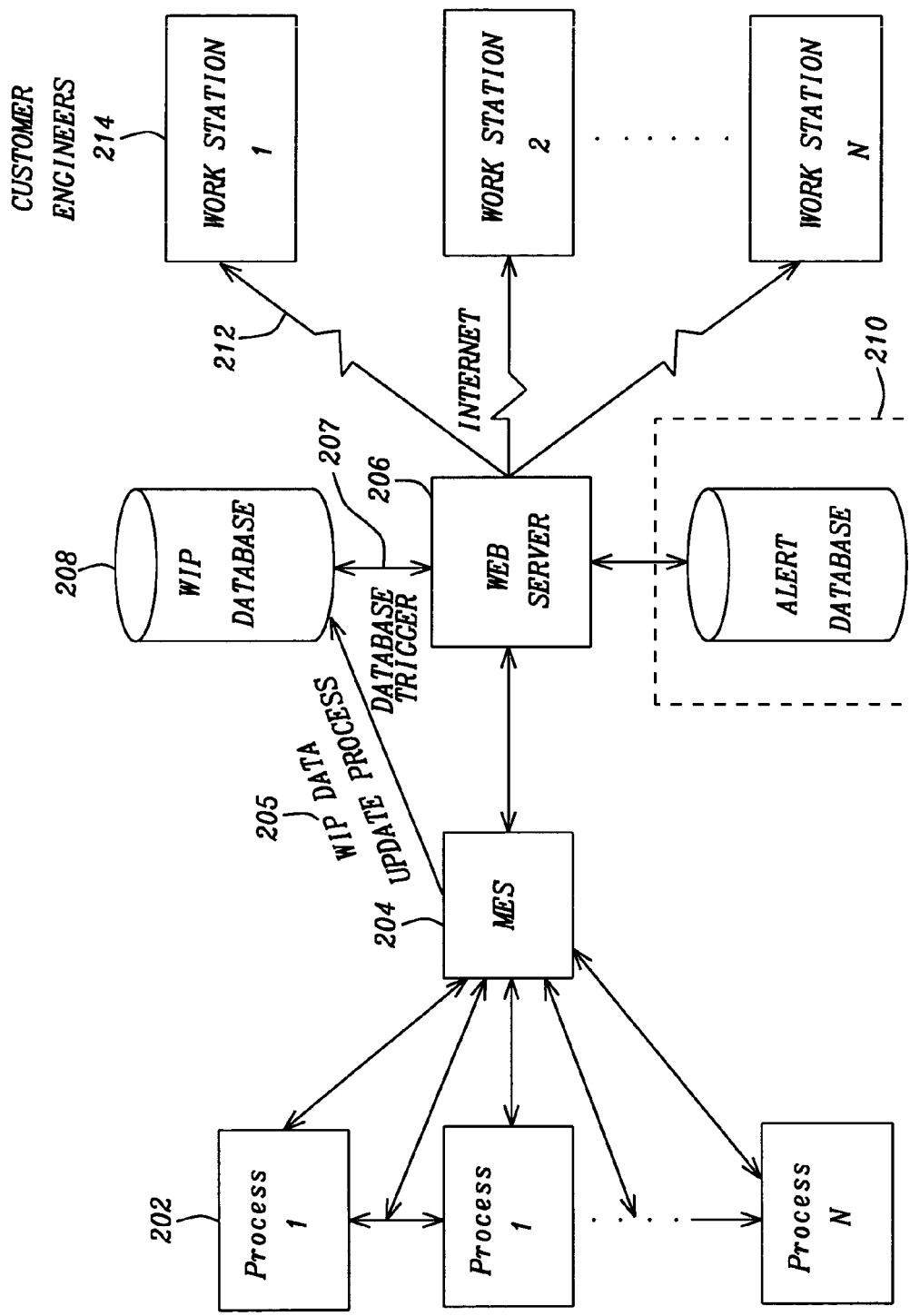
FIG. 2 is a overview block diagram of the alert system.

FIG. 2 illustrates the new system. Processes 1 to N 202 are controlled and monitored by the MES 204 as before. The MES updates the WIP Data 205 to the WIP Database 208 as before. The Web Server 206 exists as before with added code to support alert processing. Additionally, there is now a Database Trigger 207 that automatically provides for comparison of the alert and status conditions with the WIP data updates every time the WIP data is updated to see if any of the criteria is met. The customer engineer has previously defined his/her own alert and conditions for production status via the Web. These conditions can be set by product, lot, stage, and status (ex. passed, completed, scrapped) as they may differ according to user and particular stages. This input is in a format compatible to the WIP data and is stored in an Alert Database 210. If during the computer-generated comparison a match occurs between the pre-determined conditions and WIP data updates, the Customer Engineers 214 can automatically be notified at their remote workstations via the Internet 212. Notification can be by such communication means as e-mail, pager, or mobile phone. The customer engineer enters alerts using a formatted Web page provided by the server. This includes what action the customer engineer what taken when the event happens The alerts are added to the alert database and the related triggers are created in the WIP database. When an event occurs, the trigger notifies the server. The server checks the alert database to see what action to take. It then take the requested action to notify the customer engineer. This notification is usually a simple e-mail. However, customers and request that the alerts be any electronic notification method, or even as that they be notified by telephone by a manufacturing engineer for unique cases.

Figure 3:
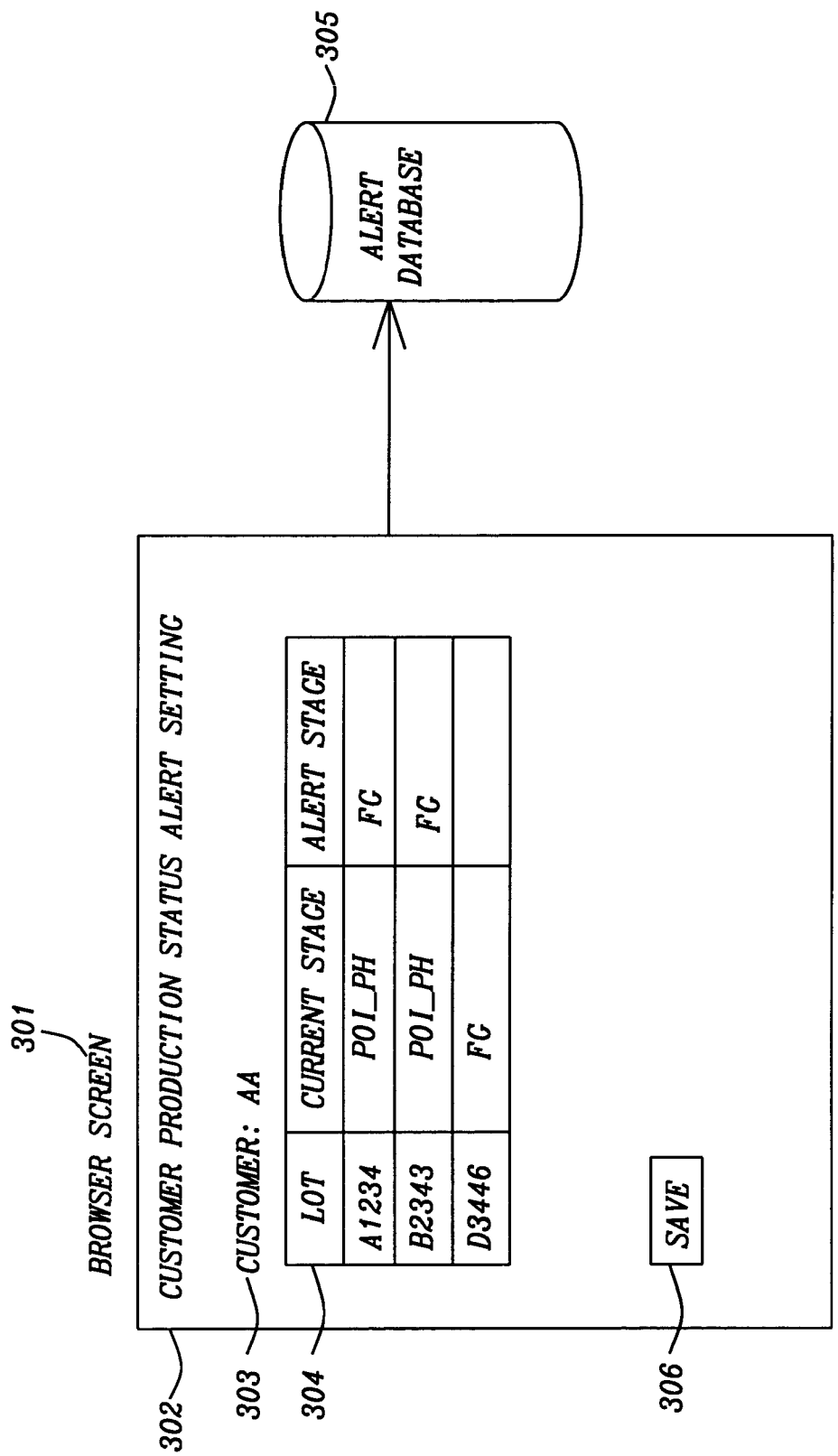
FIG. 3 is an illustration of a Web browser screen showing alert settings.

The new Alert Database 210 is created by the Web server from defining information entered into tables by the customer engineer remotely using a formatted Web page provided by the server. This allows customer engineers to easily add alerts for each lot of their work that is being processed in the foundry. FIG. 3, a browser Web screen of the customer's alert settings, shows this concept. The browser screen, set up for Customer Production Status Alert Setting, 302 is formatted to allow Customer AA 303 to have his current active lots displayed in a table 304 with their current stage and the alert stage that was previously entered into input areas for the alert requested. From this table it can be seen that lot A1234 is at the stage of production (process or location) P01_PH. An alert is set for when the lot reaches stage FG. Likewise, lot B2343 is at the same stage and has the same alert stage FG set. Lot D3446 is at stage FG and has alert set as FG. Such a match of criteria would send an automatic alert to the customer engineer as it has reached the requested alert stage. If the customer engineer has made changes to the table, Save 306 is entered and the new changes are saved in the alert database.

Customers are connected to the manufacturing Web server by specific ID. Authorization is controlled by user ID and password to ensure that only authorized customer engineers can see their own lot status. Significant time and manpower is conserved using this automated system to check production status. It is continually being done whenever the WIP database is updated (day or night), and it reflects real-time status. Customer satisfaction is improved by providing versatility and easy access to pertinent production status information.

The method of the invention provides advantages over the prior art including increased automation which saves customers' and manufacturers' engineers time and effort in checking the production status of a customer's work at the foundry, timely real-time WIP status information is provided to the customer using a simple Web interface, and the ability of the customer to easily define their own alert and conditions for production status as well as automatically receive those alerts.

While the invention has been particularly shown and described with reference to preferred embodiments thereof, it will be understood by those skilled in the art that various changes in form and details may be made without departing from the spirit and scope of the invention.

What is claimed is:

1. A method of alerting users of real-time manufacturing production status using the World Wide Web and Internet, comprising:
   a. allowing a customer to define an alert and conditions corresponding to the alert for said real-time manufacturing production status on a World Wide Web page;
   b. setting of said alert and corresponding conditions by product, lot, stage, and production status remotely by said customer using said World Wide Web page;
   c. checking the corresponding conditions when work in process data is updated; and
   d. sending real-time said alert automatically to said customer when said corresponding conditions are met.

2. The method of claim 1, wherein said Web page uses a standard browser for input by said customer.

3. The method of claim 1, wherein said work in process data is updated to a central database.

4. The method of claim 1, wherein the sending real-time said alert comprises sending said alert via electronic communication means.

5. The method of claim 2, wherein remote access is provided over said Internet controlled by user ID and password established by a server.

6. The method of claim 2, wherein the defining of said alerts and conditions is done on formatted said Web page that is provided by said server.

7. The method of claim 2, wherein said Web page visually shows in real time said customer's manufacturing production status.

8. The method of claim 2, wherein said input by said customer has the capability of being created, changed, and deleted.

9. The method of claim 3, wherein said server is connected to at least one database.

10. The method of claim 4, wherein said alert and corresponding conditions are stored in an alert database that is created by said server.

11. The method of claim 4, wherein it is possible for a plurality of said manufacturing execution systems from a plurality of Fabs to be updating said database.

12. The method of claim 6, wherein each Fab has its own manufacturing execution system.

13. The method of claim 8, wherein said formatted Web page is in table form capable of displaying a plurality of jobs.

14. The method of claim 13, wherein said electronic communication means are Internet connected devices and telephone system connected devices.

15. A system of alerting customers of manufacturing production status using the World Wide Web (Web) and Internet, comprising:
   a. means for allowing a customer to define an alert and conditions corresponding to the alert for said real-time manufacturing production status on a World Wide Web page;
   b. means for setting said alert and corresponding conditions by product, lot, stage, and production status remotely by said customer using said World Wide Web page;
   c. means for checking the corresponding conditions when work in process data is updated; and
   d. means for sending real-time said alert automatically to said customer when said conditions are met.

16. The system of claim 15, wherein said Web page uses a standard browser for input by said customer.

17. The system of claim 15, wherein said work in process data is updated to a central database.

18. The system of claim 15, wherein function is called which sends said alert via electronic communication means to said customer when said conditions are met.

19. The system of claim 16, wherein remote access is provided over said Internet controlled by user ID and password established by a server.

20. The system of claim 16, wherein the defining of said alerts and conditions is done on formatted said Web page that is provided by said server.

21. The system of claim 16, wherein said Web page visually shows in real time said customer's manufacturing production status.

22. The system of claim 16, wherein said input by said customer has the capability of being created, changed, and deleted.

23. The system of claim 17, wherein said server is connected to a database or databases.

24. The system of claim 18, wherein said alerts and conditions are contained in an alert database that is created by said server.

25. The system of claim 18, wherein it is possible for a plurality of said manufacturing execution systems from a plurality of Fabs to be updating said database.

26. The system of claim 20, wherein each Fab has its own manufacturing execution system.

* * * * *